United States Patent [19]

Okuri et al.

[11] Patent Number: 4,943,604

[45] Date of Patent: Jul. 24, 1990

[54] STRUCTURAL ADHESIVE HAVING EXCELLENT ANTI-CORROSION PROPERTIES

[75] Inventors: Yasuhiro Okuri, Mino; Toshimori Sakakibara, Shiga, both of Japan

[73] Assignee: Sunstar Giken Kabushiki Kaisha, Takatsuki, Japan

[21] Appl. No.: 277,345

[22] Filed: Nov. 29, 1988

[30] Foreign Application Priority Data

Nov. 30, 1987 [JP] Japan .................................. 62-301681

[51] Int. Cl.$^5$ .......................... C08K 5/52; C08K 3/38; C08K 3/26; C08K 3/22
[52] U.S. Cl. ..................................... 523/428; 523/436; 523/451
[58] Field of Search ....................... 523/428, 436, 451; 525/113, 111

[56] References Cited

U.S. PATENT DOCUMENTS 4,804,710  2/1989  Nakata et al. ........................ 525/113
4,845,136  7/1989  Saito et al. ............................ 523/451

Primary Examiner—Lewis T. Jacobs
Attorney, Agent, or Firm—Wegner & Bretschneider

[57] ABSTRACT

A structural adhesive having excellent anti-corrosion properties which comprises: (A) a rubber modified epoxy resin prepared by reaction of a bisphenol epoxy resin and a butadiene-acrylonitrile-(meth)acrylic acid copolymer, (B) an urethane modified epoxy resin, (C) a latent curing agent, and (D) a rust inhibiting pigment selected from the group consisting of: (i) a rust inhibiting pigment comprising aluminum orthophosphate and a zinc compound, (ii) a rust inhibiting pigment comprising aluminum metaphosphate, a zinc compound and/or an alkaline earth metal compound, and (iii) a rust inhibiting pigment comprising aluminum metaphosphate and a zinc compound and optionally an alkaline earth metal compound, wherein the adhesive contains said rubber modified epoxy resin (A) and said urethane modified epoxy resin (B) in a weight ratio of 1:9 to 3:1, and said latent curing agent (C) and said rust inhibiting pigment (D) at 0.1 to 30% by weight and at 5 to 50% by weight respectively based on a total amount of both modified epoxy resins (A) and (B) is disclosed. The structural adhesive of the present invention has extremely excellent anti-corrosion properties and is useful for heming fixation especially at an edge between an outer panel and an inner panel of an automobile.

5 Claims, No Drawings

STRUCTURAL ADHESIVE HAVING EXCELLENT ANTI-CORROSION PROPERTIES

The present invention relates to a structural adhesive having excellent anti-corrosion properties, more particularly, relates to a structural adhesive of one-pack type thermosetting epoxy resin adhesive which contains two kinds of a modified epoxy resin together with a latent curing agent and a specific rust inhibiting pigment and exhibits extremely excellent anti-corrosion properties when used for heming fixation especially at an edge between an outer panel and an inner panel such as a door, a hood, or a trunk lid of an automobile.

TECHNICAL BACKGROUND AND PRIOR ART

A structural adhesive is applied to a bonding between metal materials to exhibit an adhesive force equivalent to or more than that of the metal materials against a specific external force applied to the metal materials and is widely employed in the field of the automobile industry, the airplane industry, the can manufacturing industry, the electric industry and the electronic industry in place of or together with the conventional method of construction such as riveting, bolted joint, welding and the like.

For example, in case of assembling or bonding of a car body, for a heming fixation at an edge between an outer panel and an inner panel such as a door, a hood or a trunk lid, a periphery of the outer panel is heming-formed against a periphery of the inner panel directing toward the inside of the car body and adhered to each other and then, after applying a structural adhesive onto a periphery of the inner panel in a line, both peripheries are subjected to a spot welding for a watertight and airtight sealing, and thereby fixing the outer panel with the inner panel.

For the structural adhesive applied as mentioned above, there has been required a rust prevention. Especially in the automobile industry, automobiles exported to a cold district have been regulated with respect to anti-corrosion. That is, in a cold district, an anti-freezing agent such as a rock salt or calcium chloride is spread over the road in order to prevent freezing of the road, and as a result, a corrosion of a car body is highly accelerated to impair appearance and decrease a durability of the car. For this reason, a rust inhibiting pigment such as red lead or zinc chromate has been employed but there is a safety and sanitation problem of human and animals due to a toxicity of heavy metals (e.g. lead, chromium etc.).

For this kind of structural adhesive, there has hitherto already been developed a one-pack type thermosetting adhesive prepared by combining a resin composition containing a variety of modified epoxy resin with a latent curing agent. There have been known, for example, those prepared by combining a specific urethane modified resin and glycidyl ether epoxy resin with a latent curing agent and optionally a rust inhibiting pigment, metal powder and the like (see Japanese Patent First Publication "Kokai" No. 06882/1985) and those prepared by combining a specific rubber modified epoxy resin and aromatic epoxy resin with a latent curing agent and electroconductive carbon black (see Japanese Patent First Publication "Kokai" No. 53387/1987). Although these adhesives are endowed with electroconductivity and expected to improve anti-corrosion property by forming electrocoating film (electrodeposition) in the subsequent procedure, the former resin employing metal powder such as aluminum has the disadvantage that a pinhole is produced by generation of hydrogen gas in the electrode reaction and that there is a problem of rust generation at an interface of the periphery of panels to which the adhesive is applied. The latter resin has also the disadvantage that the anti-corrosion property of the adhesive itself is not sufficient though no pinhole is produced.

SUMMARY OF THE INVENTION

The present inventors have intensively studied as to a structural adhesive which itself has an excellent anti-corrosion properties without necessity of electrodeposition, and have found that the desired resin having an excellent anti-corrosion properties can be produced by combining two modified epoxy resins in the above known adhesives with a latent curing agent and a specific aluminum orthophosphate rust inhibiting pigment or aluminum metaphophate rust inhibiting pigment as a rust inihibiting pigment and by specifying the amount of these components.

An object of the present invention is to provide a novel structural adhesive having excellent anti-corrosion properties. These and other objects and advantages of the present invention will be apparent to persons skilled in the art from the following description.

DETAILED DESCRIPTION OF THE INVENTION

The structural adhesive of the present invention comprises:
- (A) a rubber modified epoxy resin prepared by reaction of a bisphenol epoxy resin and a butadieneacrylonitrile-(meth)acrylic acid copolymer,
- (B) an urethane modified epoxy resin,
- (C) a latent curing agent, and
- (D) a rust inhibiting pigment selected from the group consisting of:
  - (i) a rust inhibiting pigment comprising aluminum orthophosphate and a zinc compound,
  - (ii) a rust inhibiting pigment comprising aluminum metaphosphate, a zinc compound and/or an alkaline earth metal compound, and
  - (iii) a rust inhibiting pigment comprising aluminum metaphosphate and a boric acid compound and optionally an alkaline earth metal compound, wherein the adhesive contains said rubber modified epoxy resin (A) and said urethane modified epoxy resin (B) in a weight ratio of 1:9 to 3:1, and said latent curing agent (C) and said rust inhibiting pigment (D) at 0.1 to 30 (% by weight, hereinafter the same) and at 5 to 50% respectively based on a total amount of both modified epoxy resins (A) and (B).

The rubber modified epoxy resin (A) employed in the present invention can be prepared by reacting a bisphenol epoxy resin with a butadiene-acrylonitrile-(meth)acrylic acid copolymer at a temperature ranging from 80° to 180° C. in a weight ratio ranging from 5:1 to 1:4, preferably from 3:1 to 2:3. The above bisphenol epoxy resin includes, for example, bisphenol A, bisphenol F, brominated bisphenol A, a diglycidyl ether of bisphenol AD, a diglycidyl ether of an alkylene oxide adduct of bisphenol A and the like. The above butadiene-acrylonitrile-(meth)acrylic acid copolymer is that having a molecular weight of 2,000 to 6,000 wherein 1.5 to 2.5 carboxy groups per molecule are attached to the main chain on an average in a pendant-like structure.

The urethane modified epoxy resin (B) employed in the present invention can be prepared by reacting polytetramethylene ether glycol with an excess amount of a diisocyanate to give an urethane prepolymer having a free isocyanate group at its termini (hereinafter referred to as "terminal NCO prepolymer"), which is then reacted with an epoxy resin having at least one hydroxy group in the molecule (hereinafter referred to as "OH epoxy resin").

The above polytetramethylene ether glycol may have a molecular weight of 500 to 5,000, preferably 1,000 to 2,500.

The above diisocyanate includes, for example, tolylene diisocyanate, diphenylmethane diisocyanate, naphthalene diisocyanate, isophorone diisocyanate, hexamethylene diisocyanate and the like. Tolylene diisocyanate and diphenylmethane diisocyanate are preferred.

The reaction between the polytetramethylene ether glycol and the diisocyanate can be carried out in such a ratio that 1.2 to 3 molar equivalents of the isocyanate group of the latter reactant is reacted per hydroxy group of the former reactant under nitrogen atmosphere at a temperature of from 60° to 120° C. for 1 to 6 hours. The reaction between the terminal NCO prepolymer and the OH epoxy resin can usually be carried out in such a ratio that an equivalent or more (preferably 2 to 5 equivalents) of the hydroxy group of the latter is reacted per isocyanate group of the former at a temperature of from 80° to 110° C. until the reaction between the isocyanate group and the hydroxy group is completed. The unreacted polytetramethylene ether glycol which may be present after the reaction is completed is preferably removed by means of distillation etc. to avoid its elution into electrodeposition solution.

The urethane modified epoxy resin (B) is employed in such an amount that a weight ratio of the above rubber modified epoxy resin (A) to the urethane modified epoxy resin is 1:9 to 3:1, preferably 1:5 to 2:1. When the urethane modified epoxy resin (B) is employed in an amount more than a 90 % ratio, the obtained adhesive has poor flexibility and thus is incapable of stress relaxation resulting in decrease of anti-corrosion at the interface of panels, and when the resin (B) is employed in an amount less than 25%, the obtained adhesive has too much flexibility resulting in decrease of durability of the adhesive and poor anti-corrosion properties.

The latent curing agents employed in the present invention may be those activated at a temperature ranging from 100° to 180° C. and include, for example, dicyandiamide, 4,4'-diaminodiphenylsulfone, imidazole or derivatives thereof (e.g. 2-n-heptadecylimidazole, etc.), isophthalic acid dihydrazide, a N,N'-dialkyl derivative of urea, a N,N'-dialkylthio derivative of urea, a melamine derivative and the like. These latent curing agents may be used alone or in combination of two or more thereof. The latent curing agent (C) is employed in the adhesive of the present invention in an amount of 0.1 to 30%, preferably 5 to 25% based on a total amount of the above rubber modified epoxy resin (A) and the urethane modified epoxy resin (B). When the latent curing agent is employed in an amount less than 0.1%, the curing reaction is insufficient and thus the obtained adhesive has poor properties, and when the agent (C) is employed in an amount more than 30%, the cured product tends to have less flexibility.

The rust inhibiting pigment employed in the present invention is selected from the group consisting of:

(i) a rust inhibiting pigment comprising aluminum orthophosphate and a zinc compound,
(ii) rust inhibiting pigment comprising aluminum metaphosphate, a zinc compound and/or an alkaline earth metal compound, and
(iii) a rust inhibiting pigment comprising aluminum metaphosphate and a boric acid compound and optionally an alkaline earth metal compound.

The aluminum orthophophate may be any substance insofar as it contains aluminum orthophosphate in an amount not less than 50%. The crystal form of the aluminum orthophosphate is known to be berlinite, tridymite or cristobalite. The aluminum orthophosphate can be prepared by, for example, baking a mixture of phosphoric acid and a aluminum compound ($P_2O_5/Al_2O_3$=about 0.5 to about 2) at a temperature of from about 300° C. to about 1200° C.

The aluminum metaphosphate may be any substance insofar as it contains aluminum metaphosphate. The crystal form of the aluminum metaphosphate is known to be A, B, C or D. In case of the above (ii) not less than 50% of the aluminum metaphosphate is preferably in the crystal form A and in case of the above (iii) not less than 50% of the aluminum metaphosphate is preferably in the crystal form B. The aluminum metaphosphate can be prepared by, for example, reacting a phosphorus compound with an aluminum compound in a ratio of P/Al=about 1.1 to about 3, drying the obtained product at 100° to 200° C., followed by baking at 250° to 450° C. and then at 450° to 900° C. and pulverization or by baking commercially available aluminum dihydrogen tripolyphosphate.

The zinc compound, the alkaline earth metal compound and the boric acid compound may be those which do not contain or contain only a slight amount of water of crystallization released at a temperature lower than 150° C. and are difficult to dissolve or insoluble. Such water of crystallization may be released at baking to cause foaming or make it impossible to be mixed with a resin unstable to water. When a large amount of water of crystallization is contained, it can previously be removed by baking. Examples of the zinc compound are zinc oxide, zinc hydroxide, basic zinc carbonate, zinc borate, basic zinc phosphate and the like, zinc oxide being preferred. The alkaline earth metal compound includes, for example, a carbonate, a basic carbonate, a basic sulfate, a basic phosphate, a silicate, an oxide, a hydroxide and the like, of an alkaline earth metal (e.g. Ca, Ba, Sr etc.). The boric acid compound includes, for example, calcium borate, magnesium borate, barium borate, barium metaborate and the like.

The above rust inhibiting pigments (i) to (iii) can be prepared by either subjecting the aluminum orthophosphate or the aluminum metaphosphate together with each metallic compound to dry blending or to wet blending reaction in water followed by dehydration and drying. It may also be possible to add separately each component to the resin. The alkaline earth metal compound having high basicity is preferably subjected to wet blending reaction in water to give a resin in which stability is improved.

Each rust inhibiting pigment contains components in a ratio as mentioned hereinbelow.

In case of (i), the rust inhibiting pigment contains the aluminum orthophosphate and the zinc compound in a weight ratio ranging from 10:1 to 1:1 wherein the pH of the pigment is in a range from 4 to 10. Particularly, the rust inhibiting pigment containing the aluminum orthophosphate and zinc oxide at a ratio of 5:2 with pH of about 6 exhibits more excellent anti-corrosion properties and can be combined with a wide variety of the resin.

Also in case of (ii) and (iii), the rust inhibiting pigment may contain each component so that the pH of the pigment becomes 4 to 10. Particularly, the pigment containing a combination of the aluminum metaphosphate with zinc oxide or with barium metaborate with pH of 5 to 8 exhibits more excellent anti-corrosion properties and can be combined with a wide variety of the resin.

The rust inhibiting pigment selected from the group consisting of (i) to (iii) may be used alone or in combination of two or more thereof. Since water of crystallization in each component is controlled as mentioned above and thus the rust inhibiting pigment (D) contains entirely no or at most 5 % of water of crystallization, no foaming will be produced in the adhesive layer. The pigment (D) is employed in an amount ranging from 5 to 50%, preferably from 10 to 40% based on a total amount of the rubber modified epoxy resin (A) and the urethane modified epoxy resin (B). When the amount is less than 5%, the desired anti-corrosion properties cannot be obtained, and when the amount is over 50%, the cured adhesive has poor properties.

The structural adhesive having excellent anti-corrosion of the present invention can be prepared by blending the above rubber modified epoxy resin (A), the urethane modified epoxy resin (B), the latent curing agent (C) and the rust inhibiting pigment (D) in a specific amount. The structural adhesive of the present invention may also contain electroconductive carbon black (e.g. acetylene black, ketjen black, etc.) or ferrite not producing pinhole, and further usual epoxy resin (preferably bisphenol epoxy resin), a filler (calcium carbonate, kaolin, silica, talc, etc.), a plasticizer and the like in a suitable amount.

The present invention is illustrated by the following Preparations (preparation of the rust inhibiting pigment of the present invention), Examples and Comparative Example but should not be construed to be limited thereto.

PREPARATION 1

(1) Preparation of aluminum orthophosphate:

(a) A mixture of phosphoric acid (first grade reagent) (1 mole) and aluminum hydroxide manufactured by Sumitomo Aluminum Refining Co., Ltd., C-12) (1 mole) is heated in a paste ($P_2O_5/Al_2O_3=1/1$), which is taken in a ceramic crucible. The ceramic crucible containing the paste is put in an electric furnace and baking is conducted at 300° C. for 6 hours and then at 800° C. for 1 hour, followed by pulverization to give aluminum orthophosphate (the main component is in the crystal form of berlinite; the weight loss ratio when heated at 200° C. for 2 hours is 0.11%).

(b) A mixture of phosphoric acid (the same as above) (1 mole) and aluminum hydroxide (manufactured by Sumitomo Aluminum Refining Co., Ltd., C-315) (1 mole) is baked at 1100° C. for 2 hours, followed by pulverization to give aluminum orthophosphate (in the crystal form of cristobalite; the weight loss when heated at 200° C. for 2 hours is 0.05%).

(2) Preparation of rust inhibiting pigment:

Each aluminum orthophosphate prepared in the above processes (a) and (b) is dry-blended with zinc oxide at a weight ratio of 5:2 (aluminum orthophosphate:zinc oxide) to give rust inhibiting pigments (A) and (B) with pH of 6.5 and 6.2, respectively.

PREPARATION 2

(1) Preparation of aluminum metaphosphate:

(a) 85% Phosphoric acid (216.0 g) is reacted with aluminum hydroxide (59% as $Al_2O_3$) (58.0 g) in a beaker and the reaction product is dried at 200° C. The product is baked at 300° C. for 2 hours and then at 900° C. for 2 hours followed by pulverization to give aluminum metaphosphate (the main component is in the crystal form of A and a slight amount is in the crystal form of B; the amount of water of crystallization is 0.28%).

(b) Aluminum dihydrogen tripolyphosphate (manufactured by Teikoku Chemical Industries Co., Ltd., K-Fresh#100P) is baked at 900° C. for 2 hours to give aluminum metaphosphate (a mixture of the crystal forms of A and B; the amount of water of crystallization is 0.33%).

(2) Preparation of rust inhibiting pigment:

Each aluminum metaphosphate prepared in the above processes (a) and (b) is dry-blended with zinc oxide at a weight ratio of 5:2 (aluminum metaphosphate:zinc oxide) to give rust inhibiting pigments (C) (pH 7.1) and (D) (pH 6.9).

PREPARATION 3

(1) Preparation of aluminum metaphosphate:

(a) The procedure of the above process (1) (a) of Preparation Example 2 is repeated except that, after the drying procedure, the product is baked at 300° C. for 2 hours and then at 600° C. for 2 hours to give aluminum metaphosphate (the main component is in the crystal form of B and a slight amount is in the crystal form of A; the amount of water of crystallization is 0.31%).

(b) The procedure of the above process (1) (b) of Preparation Example 2 is repeated except that the baking is carried out at 500° C. for 2 hours to give aluminum metaphosphate (a mixture of nearly equivalent amounts of the crystal forms of (B) and (D); the amount of water of crystallizaiton is 0.37%).

(2) Preparation of rust inhibiting pigment:

Each aluminum metaphosphate prepared in the above processes (a) and (b) is dry-blended with barium metaborate at a weight ratio of 1:1 to give rust inhibiting pigments (E) (pH 9.2) and (F) (pH 9.0).

EXAMPLES 1 to 3 AND COMPARATIVE EXAMPLE 1

The components of the parts by weight as shown in the following Table 1 are blended with a kneader, passed through a triple roll and again stirred with a kneader with degassing to give adhesives.

TABLE 1

| Component (parts) | Adhesive | | | |
|---|---|---|---|---|
| | Ex. 1 | Ex. 2 | Ex. 3 | Comp. Ex. 1 |
| Rubber modified epoxy resin *1 | 60 | 40 | 20 | — |
| Urethane modified epoxy resin *2 | 40 | 40 | 70 | 80 |
| Bisphenol epoxy resin *3 | — | 20 | 10 | 20 |
| Dicyandiamide | 8 | 8 | 8 | 8 |
| Imidazole | 5 | 5 | 5 | 5 |

TABLE 1-continued

| | Adhesive | | | |
|---|---|---|---|---|
| Component (parts) | Ex. 1 | Ex. 2 | Ex. 3 | Comp. Ex. 1 |
| Rust inhibiting pigment *4 | 30 | 30 | 30 | 30 |

(Note)
*1 A flask provided with a stirrer, a thermometer and a condenser is charged with bisphenol A epoxy resin having an epoxy equivalent of 215 (manufactured by Yuka Shell Epoxy Co., Ltd.; Epicote 807) (60 parts by weight) and butadiene-acrylonitrile(meth)acryric acid copolymer (manufactured by Nippon Zeon Co., Ltd.; Nipole DN-601) (40 parts by weight) and the mixture is reacted at 120° C. for 6 hours to give rubber modified epoxy resin having an acid value of 0.2 and an epoxy equivalent169ent of 450.
*2 A mixture of polytetramethylene ether glycol (molecular weight: 1,000) (100 parts by weight) and tolylene diisocyanate (35 parts by weight) is placed in a flask under nitrogen atmosphere. The mixture is heated up to 80° C. and reacted with stirring for 3 hours to give a terminal NCO prepolymer. To the obtained prepolymer (45 parts by weight) is added diglycidyl ether of bisphenol A (epoxy equivalent: 215; hydroxy equivalent: 900) (250 parts by weight) and the mixtureis reacted at 95° C. for 7 hours to give urethane modified epoxy resin having an epoxy equivalent of 200.
*3 Epicote 807 manufactured by Yuka Shell Co., Ltd.
*4 The rust inhibiting pigment (D) prepared in Preparation Example 2

Test for anti-corrosion and adhesion (1) Corrosion test:

The adhesive applied 30 mm in width and 2 mm in thickness onto toluene-degreased SPC steel plate (0.8×25 ×100 mm) is heated at 170° C. for 30 minutes to cure and then subjected to the following rusting test to evaluate anticorrosion.

(a) Salt spraying test:
5% Salt is sprayed at 35° C. for 1,000 h ours.
O: No rust in the interface or the substrate
X: Rust is found in the interface or the substrate.

(b) Complex corrosion 60 cycles test:
Three conditions of a wet condition (50° C., 95% RH, 16 hours), a dry condition (70° C., 4 hours) and a salt water spraying condition (35° C., 5% salt water, 4 hours) are repeated in 60 cycles.
O: Depth of corrosion by rust is less than 0.1 mm.
X: Depth of corrosion by rust is not less than 0.1 mm.
The result is shown in Table 2.

(2) Adhesion test:

The adhesive is applied 0.15 mm in thickness onto one toluene-degreased steel plate (0.8×25×100 mm) and thereto another toluene-degreased steel plate is put, which is heated at 170° C. for 30 minutes to cure followed by being left to stand at room temperature for 24 hours. T peel strength is measured at a tensile speed of 200 mm/min. The result is shown in Table 2.

TABLE 2

| | Ex. 1 | Ex. 2 | Ex. 3 | Cop. Ex. 1 |
|---|---|---|---|---|
| (a) Salt spraying (1,000 hours) | O | O | O | X |
| (b) Complex corrosion (60 cycles) | O | O | O | X |
| T peel strength (Kg/25 mm) | 15 | 15 | 15 | 10 |

Additionally, the rust inhibiting pigments (A), (B), (C) and (F) are employed in place of the pigment (D) in Examples 1 to 3 and the procedure is repeated employing the components shown in Table 1 to prepare various adhesives, which are also subjected to salt spraying test and complex corrosion test for evaluating anti-corrosion. As a result, these adhesives showed no rust in the interface or the substrate in the salt spraying test and the depth of corrosion by rust of not more than 0.1 mm in the complex corrosion test.

What is claimed is:

1. A structural adhesive having excellent anticorrosion properties which comprises:
   (A) a rubber modified epoxy resin prepared by reaction of a bisphenol epoxy resin and a butadienacrylonitrile-(meth)acrylic acid copolymer,
   (B) an urethane modified epoxy resin,
   (C) a latent curing agent, and
   (D) a rust inhibiting pigment selected from the group consisting of:
      (i) a rust inhibiting pigment comprising aluminum orthophosphate and a zinc compound,
      (ii) a rust inhibiting pigment comprising aluminum metaphosphate, a zinc compound and/or an alkaline earth metal compound, and
      (iii) a rust inhibiting pigment comprising aluminum metaphosphate and a boric acid compound and optionally an alkaline earth metal compound,
   wherein the adhesive contains said rubber modified epoxy resin (A) and said urethane modified epoxy resin (B) in a weight ratio of 1:9 to 3:1, and said latent curing agent (C) and said rust inhibiting pigment (D) at 0.1 to 30% by weight and at 5 to 50% by weight respectively based on a total amount of both modified epoxy resins (A) and (B).

2. The structural adhesive of claim 1 wherein the urethane modified epoxy resin (B) is prepared by reacting an urethane prepolymer having isocyanate group at its termini, prepared by reacting polytetramethylene ether glycol with a diisocyanate, with an epoxy resin having hydroxy group.

3. The structural adhesive of claim 2 wherein the polytetramethylene ether glycol has a molecular weight of 500 to 5,000.

4. The structural adhesive of claim 2 wherein the diisocyanate is a member selected from the group consisting of tolylene diisocyanate, diphenylmethane diisocyanate, naphthalene diisocyanate, isophorone diisocyanate and hexamethylene diisocyanate.

5. The structural adhesive of claim 1 wherein the latent curing agent is a member selected from the group consisting of dicyandiamide, 4,4'-diaminodiphenylsulfone, imidazole or derivative thereof, isophthalic acid dihydrazide, a N,N'-dialkyl derivative of urea, a N,N'-dialkylthio derivative of urea and a melamine derivative.

* * * * *